United States Patent [19]

Orvik

[11] 4,118,373

[45] Oct. 3, 1978

[54] PREPARATION OF URETHANE ELASTOMERS FROM EPOXY RESIN, POLYOLS AND POLYISOCYANATES USING A CATALYST COMPOSITION OF AN ORGANOMETAL SALT WITH EITHER NITROGEN OR PHOSPHORUS COMPOUNDS

[75] Inventor: Jon A. Orvik, Danville, Calif.

[73] Assignee: The Dow Chemical Company, Midland, Mich.

[21] Appl. No.: 793,569

[22] Filed: May 4, 1977

[51] Int. Cl.$^2$ .............................................. C08G 18/18
[52] U.S. Cl. ...................................... 528/73; 528/51; 528/53
[58] Field of Search ...... 260/47 EP, 47 EC, 77.5 AB, 260/77.5 AC

[56] References Cited

U.S. PATENT DOCUMENTS

| | | | |
|---|---|---|---|
| 3,020,262 | 2/1962 | Speranya | 260/47 EP |
| 3,470,121 | 9/1969 | Cobbledick | 260/77.5 AB |
| 3,509,104 | 4/1970 | Fuchsman et al. | 260/77.5 AB |
| 3,702,839 | 11/1972 | Glasgow et al. | 260/77.5 AB |

*Primary Examiner*—M. J. Welsh
*Attorney, Agent, or Firm*—J. G. Carter

[57] ABSTRACT

Elastomers are prepared from a mixture comprising a 1600 equivalent weight polyether polyol such as a glycerine initiated polyoxypropylene glycol end-capped with ethylene oxide, a diol such as diethylene glycol, a liquid polyepoxide such as the diglycidyl ether of bisphenol A and a catalyst mixture containing a quaternary ammonium or phosphonium salt and an organometal salt of the metal tin or lead such as tetrabutyl ammonium bromide and lead octoate.

3 Claims, No Drawings

PREPARATION OF URETHANE ELASTOMERS FROM EPOXY RESIN, POLYOLS AND POLYISOCYANATES USING A CATALYST COMPOSITION OF AN ORGANOMETAL SALT WITH EITHER NITROGEN OR PHOSPHORUS COMPOUNDS

SUMMARY OF THE INVENTION

The present invention pertains to polyurethane elastomers and more particularly pertains to polyurethane elastomers modified with an epoxy resin and cured with a co-catalyst system.

BACKGROUND OF THE INVENTION

Polyurethanes have found many uses such as in caulking compositions, coatings, adhesives, elastomers and the like. Elastomers have recently found particular utility in the automobile industry as bumpers and the like.

The present invention is directed to polyurethane elastomer formulations which are particularly suitable in meeting the requirements for automobile fascia.

DETAILED DESCRIPTION OF THE INVENTION

The present invention is directed to urethane elastomers modified with an epoxy resin which results from the curing of a mixture of components comprising (A) from about 3 to about 30 preferably from about 6 to about 15 percent by weight of a liquid epoxy resin having an average of more than one vicinal epoxy group;

(B) from about 35 to about 60, preferably from about 40 to about 50 percent by weight of a polyol composition containing (1) a liquid polyether polyol or mixture of such polyols having an average functionality of from about 2 to about 3 and an average hydroxyl equivalent weight of from about 500 to about 2000, and (2) a liquid low molecular weight diol having an average equivalent weight of from about 30 to about 90 wherein components (1) and (2) are present in quantities such that the ratio of hydroxyl equivalents of (1) to (2) is from about 0.05:1 to about 0.2:1, preferably from about 0.08:1 to about 0.15:1;

(C) an organic polyisocyanate in a quantity so as to provide an NCO:OH equivalent ratio of from about 0.85:1 to about 1.2:1, preferably from about 0.9:1 to about 1.1:1; and (D) a catalytic quantity of a catalyst composition consisting of (1) from about 20 to about 95, preferably from about 50 to about 80 percent by weight of a catalyst represented by the formula

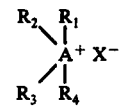

wherein each $R_1$, $R_2$, $R_3$, and $R_4$ are independently selected from an aliphatic hydrocarbon, aromatic hydrocarbon, substituted aliphatic hydrocarbon, substituted aromatic hydrocarbon groups having from 1 to about 8 carbon atoms; X is the anion portion of an inorganic acid or an acid, ester or acid ester of the element carbon and A is nitrogen or phosphorus; and (2) from about 5 to about 80, preferably from about 20 to about 50 percent by weight of an organometal salt catalyst of the metal tin or lead.

Suitable liquid epoxy resins which can be employed herein as Component (A) include, for example, glycidyl ethers of polyhydric aliphatic and aromatic compounds such as, for example, polyoxyalkylene glycols having 2 to 4 carbon atoms in the alkylene groups, glycerine, trimethylol propane, neopentyl glycol, halogenated neopentyl glycol, catechol, hydroquinone, resorcinol, bisphenol A, novalac resins, mixtures thereof and the like. Particularly suitable resins include those represented by the following formulas.

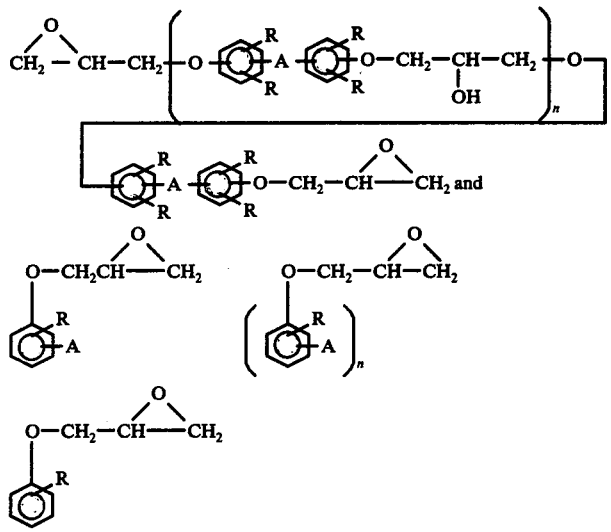

wherein A is a divalent hydrocarbon group having from 1 to about 8 carbon atoms, each R is independently selected from hydrogen, chlorine and bromine and n has a value such that the epoxy resin is a pourable liquid at ordinary temperatures.

Suitable polyols which can be employed herein as Component (B-1) include, for example, those prepared by reacting an initiator compound having from 2 to about 3 active hydrogen atoms per molecule with a vicinal epoxide having from 2 to about 4 carbon atoms.

Suitable initiator compounds include glycerine, trimethylol propane, ethylene glycol, diethylene glycol, propylene glycol, dipropylene glycol, 1,4-butanediol, 1,3-butanediol, 1,2-butanediol, 1,6-hexane diol, 1,4-hexanediol, mixtures thereof and the like.

Suitable vicinal epoxides include, for example, ethylene oxide, propylene oxide, 1,2-butylene oxide, 2,3-butylene oxide, epichlorohydrin epibromohydrin, methylepichlorohydrin, methylepibromohydrin mixtures thereof and the like.

Suitable low molecular weight diols which can be employed herein as Component (B-2) include, for example, 1,4-butanediol, 1,6-hexanediol, 1,4-hexanediol, ethylene glycol, diethylene glycol, 1,2-propylene glycol, di-1,2-propylene glycol, mixtures thereof and the like.

Suitable isocyanates which can be employed herein as Component (C) include, for example,
  2,4-toluene diisocyanate
  2,6-toluene diisocyanate
  polymethylene polyphenylisocyanate
  1,5-naphthalenediisocyanate
  cumene-2,4-diisocyanate
  4-methoxy-1,3-phenylenediisocyanate
  4-chloro-1,3-phenylenediisocyanate
  4-bromo-1,3-phenylenediisocyanate
  4-ethoxy-1,3-phenylenediisocyanate
  isophoronediisocyanate
  2,4'-diisocyanatodiphenylether
  4,4'-diphenylmethane diisocyanate
  5,6-dimethyl-1,3-phenylenediisocyanate
  2,4-dimethyl-1,3-phenylenediisocyanate
  4,4'-diisocyanatodiphenylether benzidinediisocyanate
  4,6-dimethyl-1,3-phenylenediisocyanate
  4,4'-diisocyanatodibenzyl
  9,10-anthracenediisocyanate
  3,3'-dimethyl-4,4'-diisocyanatodiphenylmethane
  2,6-dimethyl-4,4'-diisocyanatodiphenyl
  2,4-diisocyanatostilbene
  3,3'-dimethyl-4,4'-diisocyanatodiphenyl
  3,3'-dimethoxy-4,4'-diisocyanatodiphenyl
  1,4-anthracenediisocyanate
  2,5-fluorenediisocyanate
  1,8-naphthalenediisocyanate
  2,6-diisocyanatobenzfuran
  2,4,6-toluenetriisocyanate and
  2,4,4'-triisocyanatodiphenylether crude or undistilled isocyanates dimers or trimers of toluene diisocyanates mixtures thereof and the like.

Also suitable are prepolymers of such polyisocyanates with polyether polyols as well as those described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Suitable catalysts which can be employed herein as Component (D) include, for example,
  benzyltrimethyl ammonium acetate
  benzyltriethyl ammonium formate
  di-(tolyl trimethyl ammonium)-formate
  benzyltrimethyl ammonium ethyl hexoate
  di-(benzyltrimethyl ammonium)-oxalate
  di-(benzyltrimethyl ammonium)-tartarate
  benzyltrimethyl ammonium lactate
  ethylene bis(trimethyl ammonium acetate)
  octyl trimethyl ammonium benzoate
  benzyltributyl ammonium acetate
  benzyltrimethyl ammonium bromide
  benzyltrimethyl ammonium chloride
  benzyltrimethyl ammonium iodide
  methyl triphenyl phosphonium iodide
  ethyl triphenyl phosphonium iodide
  propyl triphenyl phosphonium iodide
  n-butyl triphenyl phosphonium iodide
  iso-butyl triphenyl phosphonium iodide
  sec-butyl triphenyl phosphonium iodide
  n-pentyl triphenyl phosphonium iodide,
  n-decyl triphenyl phosphonium iodide
  methyl tributyl phosphonium iodide
  ethyltributyl phosphonium iodide
  propyl tributyl phosphonium iodide,
  methyl triphenyl phosphonium chloride
  ethyl triphenyl phosphonium chloride
  propyl tributyl phosphonium iodide
  n-butyl triphenyl phosphonium chloride and
  ethyl triphenyl phosphonium bromide
  di(ethyltriphenylphosphonium) carbonate
  ethyltriphenylphosphonium ethylcarbonate
  ethyltriphenylphosphonium ethyloxalate
  di(ethyltriphenylphosphonium)oxalate
  phenyltributyl phosphonium acetate
  chloroethyltriphenylphosphonium acetate
  iodobutyltriphenylphosphonium acetate
  bromopropyltriphenylphosphonium acetate
  nitropentyltriphenylphosphonium acetate
  methyl tributyl phosphonium acetate
  ethyl tributyl phosphonium acetate
  propyl tributyl phosphonium acetate
  tetrabutyl phosphonium acetate
  tetramethyl phosphonium acetate
  tetrapropyl phosphonium acetate
  ethyl tricyclohexyl phosphonium acetate
  methyltrioctyl phosphonium acetate
  tetrabutyl phosphonium propionate,
  mixtures thereof and the like.

Also suitable are the acid salt complexes of the phosphonium catalysts such as, for example, ethyltriphenyl phosphonium acetate·acetic acid complex, tetrabutylphosphonium acetate·acetic acid complex and the like.

Suitable organometal salt catalysts of tin or lead include, for example, lead octoate, lead naphthenate, stannous actoate, dibutyltin dilaurate, mixtures thereof and the like.

The particular quantity of catalyst employed depends upon the particular components being catalyzed and the particular catalyst being employed. However, generally the quantity of total catalyst employed is from about 0.1 to about 4.0 and most usually from about 0.2 to about 2.0 parts by weight based upon the combined weight of components (A), (B), and (C).

Other components can be added to the composition of the present invention such as, for example, pigments, dyes, fillers, fire retardant additives, reinforcing agents, and the like.

The following examples are illustrative of the present invention and are not to be construed as to limiting the scope thereof in any manner.

The elastomers of the present invention can be rapidly formed and solidify without any additional heat within about 1 minute after admixture of the components.

EXAMPLE 1

A mixture consisting of
11.35 grams of diethylene glycol;
3.8 grams of monoethylene glycol;
69.7 grams of the reaction product of glycerine with propylene oxide and end-capped with ethylene oxide having an OH equivalent weight of about 1650 and containing from about 13 to about 15 percent by weight of ethylene oxide end capping;
15.15 grams of the diglycidylether of bisphenol A having an epoxide equivalent weight of 182–190;
0.2 grams of tetrabutyl ammonium bromide;
60.6 grams of an adduct prepared from 84.5 parts by weight of 80/20 2,4-/2,6-toluene diisocyanate and a mixture consisting of 7.3 parts by weight of dipropylene glycol and 8.3 parts by weight of an adduct of glycerine and propylene oxide having an OH equivalent weight of about 87; said adduct containing about 31.8% NCO groups; and
1 drop (0.03 grams) of lead octoate containing 24% lead by weight was placed into a pan at room temperature wherein it solidified into a clear, bubble-free casting which solidified within 1 minute after mixing. The resultant product after heating at 110° C. for about 1 hour had the following properties.

Flexural modulus, 27,200 psi* (1912 kg/cm²)
Shore D hardness, 63
Tensile strength, 2800 psi* (197 kg/cm²)
Elongation, 145%*
Tear strength, 502 lbs/in* (89.6 kg/cm)
*average of three samples

I claim:
1. Urethane elastomers modified with an epoxy resin which results from the curing of a mixture of components comprising
   (A) from about 3 to about 30 percent by weight of a liquid epoxy resin having an average of more than one vicinal epoxy group;
   (B) from about 35 to about 60 percent by weight of of a polyol composition containing
      (1) a liquid polyether polyol or mixture of such polyols having an average functionality of from about 2 to about 3 and an average hydroxyl equivalent weight of from about 500 to about 2000, and
      (2) a liquid low molecular weight diol having an average equivalent weight of from about 30 to about 90 wherein components (1) and (2) are present in quantities such that the ratio of hydroxyl equivalents of (1) to (2) is from about 0.05:1 to about 0.2:1;
   (C) an organic polyisocyanate in a quantity so as to provide an NCO:OH equivalent ratio of from about 0.85:1 to about 1.2:1; and
   (D) a catalytic quantity of a catalyst composition consisting of
      (1) from about 20 to about 95 percent by weight of a catalyst represented by the formula

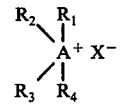

wherein each $R_1$, $R_2$, $R_3$ and $R_4$ are independently selected from an aliphatic hydrocarbon, aromatic hydrocarbon, substituted aliphatic hydrocarbon, substituted aromatic hydrocarbon groups having from 1 to about 8 carbon atoms; X is the anion portion of an inorganic acid or an acid, ester or acid ester of the element carbon and A is nitrogen or phosphorus; and
      (2) from about 5 to about 80 percent by weight of an organometal salt catalyst of the metal tin or lead.

2. The elastomers of claim 1 wherein X is Cl, Br or I and Component C is an aromatic polyisocyanate.

3. The elastomers of claim 2 wherein component (A) is present in a quantity of from about 6 to about 15 percent by weight; component (B) is present in a quantity of from about 40 to about 50 percent by weight; components (B-1) and (B-2) are present in a hydroxyl equivalent ratio of from about 0.08:1 to about 0.15:1; component (C) is present in a quantity such that the NCO:OH ratio is from about 0.9:1 to about 1.1:1; component (D-1) is present in a quantity of from about 50 to about 80 percent by weight and component (D-2) is present in a quantity of from about 20 to about 50 percent by weight.

* * * * *